(12) United States Patent
Lee

(10) Patent No.: US 7,575,414 B2
(45) Date of Patent: Aug. 18, 2009

(54) TURBINE NOZZLE WITH TRAILING EDGE CONVECTION AND FILM COOLING

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 11/097,604

(22) Filed: Apr. 1, 2005

(65) Prior Publication Data

US 2006/0222497 A1   Oct. 5, 2006

(51) Int. Cl.
*F04D 29/38* (2006.01)
(52) U.S. Cl. .................................. 415/115; 416/97 R
(58) Field of Classification Search ............... 415/115; 416/97 R, 160
See application file for complete search history.

(56) References Cited

U.S. PATENT DOCUMENTS

| | | | | |
|---|---|---|---|---|
| 4,514,144 A * | 4/1985 | Lee | ............ | 416/96 R |
| 4,627,480 A * | 12/1986 | Lee | ............ | 164/369 |
| 5,395,212 A * | 3/1995 | Anzai et al. | ............ | 416/97 R |
| 5,700,132 A * | 12/1997 | Lampes et al. | ............ | 416/97 R |
| 5,738,493 A * | 4/1998 | Lee et al. | ............ | 416/97 R |
| 5,772,397 A * | 6/1998 | Morris et al. | ............ | 415/115 |
| 5,797,726 A * | 8/1998 | Lee | ............ | 416/96 R |
| 6,089,826 A * | 7/2000 | Tomita et al. | ............ | 416/96 R |
| 6,554,571 B1 * | 4/2003 | Lee et al. | ............ | 416/92 |
| 6,602,047 B1 | 8/2003 | Barreto et al. | | |
| 6,607,355 B2 * | 8/2003 | Cunha et al. | ............ | 416/97 R |
| 6,612,811 B2 * | 9/2003 | Morgan et al. | ............ | 416/97 R |
| 6,672,836 B2 * | 1/2004 | Merry | ............ | 416/97 R |
| 6,929,451 B2 * | 8/2005 | Gregg et al. | ............ | 416/96 R |
| 7,278,827 B2 * | 10/2007 | Boury et al. | ............ | 416/97 R |

* cited by examiner

*Primary Examiner*—Edward Look
*Assistant Examiner*—Aaron R Eastman
(74) *Attorney, Agent, or Firm*—Adams Intellectual Property Law, P.A.; William Scott Andes, Esq.

(57) ABSTRACT

A hollow cooled airfoil includes an array of radially-spaced apart, longitudinally-extending partitions defining a plurality of cooling channels therebetween. A plurality of aft pins are disposed in at least one of the cooling channels. Elongated turbulators are disposed in at least one of the cooling channels, and are oriented at an angle to a longitudinal axis of the vane such that an aft end of each of the turbulators is closer to an adjacent partition than a forward end of the turbulator. The vane includes an array of radially-spaced apart, alternating longitudinally-extending lands and longitudinally-extending dividers which define plurality of trailing edge slots therebetween. Each of the trailing edge slots has an inlet in fluid communication with a trailing edge cavity and an axially-downstream exit in fluid communication with the vane's trailing edge. The dividers have an axial length less than an axial length of the lands.

20 Claims, 7 Drawing Sheets

TURBINE NOZZLE WITH TRAILING EDGE CONVECTION AND FILM COOLING

BACKGROUND OF THE INVENTION

This invention relates generally to gas turbine components, and more particularly to cooled turbine airfoils.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

The turbine nozzle comprises a row of circumferentially side-by-side nozzle segments each including one or more stationary airfoil-shaped vanes mounted between inner and outer band segments for channeling the hot gas stream into the turbine rotor. Each of the vanes includes pressure and suction sidewalls that are connected at a leading edge and a trailing edge. The temperature distribution of a typical vane is such that the trailing edge is significantly hotter than the remainder of the airfoil. The temperature gradient created results in high compressive stress at the vane trailing edge, and the combination of high stresses and high temperatures generally results in the vane trailing edge being the life limiting location of the vane. Accordingly, in prior art vanes, the trailing edge portion is cooled using a source of relatively cool air, such as compressor discharge air, through a combination of internal convective cooling and film cooling. While this configuration increases the life of the vane, there remains a need for enhanced cooling of the trailing edge portion of turbine airfoils.

BRIEF SUMMARY OF THE INVENTION

The above-mentioned need is met by the present invention, which according to one aspect provides an airfoil for a gas turbine engine having, the airfoil having a longitudinal axis, a root, a tip, a leading edge, a trailing edge, and opposed pressure and suction sidewalls, and comprising: an array of radially-spaced apart, longitudinally-extending partitions defining a plurality of cooling channels therebetween; a plurality of aft pins disposed substantially in the middle of at least one of the cooling channels and extending between the pressure and suction sidewalls; and a plurality of elongated turbulators disposed in at least one of the cooling channels, the turbulators oriented at an angle to the longitudinal axis such that an aft end of each of the turbulators is closer to an adjacent partition than a forward end of the turbulator. The airfoil includes an array of radially-spaced apart, alternating longitudinally-extending lands and longitudinally-extending dividers, the lands and dividers defining a plurality of trailing edge slots therebetween, each of the trailing edge slots having an inlet in fluid communication with the trailing edge cavity and an axially-downstream exit in fluid communication with the trailing edge. The dividers have an axial length less than an axial length of the lands.

According to another aspect of the invention, a turbine nozzle segment includes an arcuate outer band; an arcuate inner band; and at least one airfoil disposed between the inner and outer bands, the airfoil having opposed pressure and suction sides extending between a leading edge and a trailing edge thereof. The airfoil includes an array of radially-spaced apart, longitudinally-extending partitions defining a plurality of cooling channels therebetween; a plurality of aft pins disposed substantially in the middle of at least one of the cooling channels and extending between the pressure and suction sidewalls; and a plurality of elongated turbulators disposed in at least one of the cooling channels, the turbulators oriented at an angle to the longitudinal axis such that an aft end of each of the turbulators is closer to an adjacent partition than a forward end of the turbulator. The airfoil also includes an array of radially-spaced apart, alternating longitudinally-extending lands and longitudinally-extending dividers which define a plurality of trailing edge slots therebetween. Each of the trailing edge slots having an inlet in fluid communication with the trailing edge cavity and an axially-downstream exit in fluid communication with the trailing edge. The dividers have an axial length less than an axial length of the lands.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
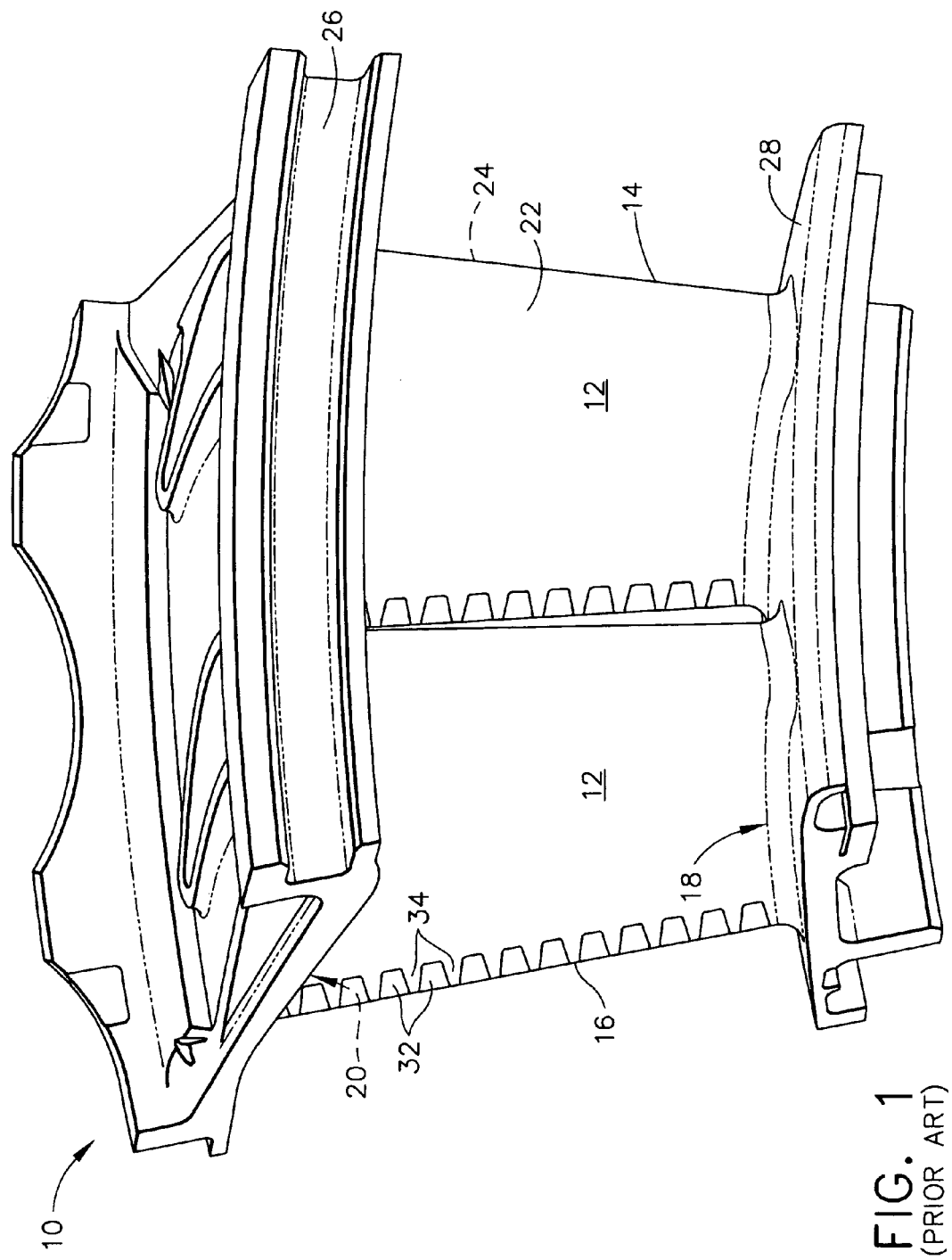
FIG. 1 is a perspective view of a prior art turbine nozzle segment.

Referring to the drawings wherein identical reference numerals denote the same elements throughout the various views, FIG. 1 illustrates a prior art high pressure turbine (HPT) nozzle segment 10 as disclosed in U.S. Pat. No. 6,602, 047 issued to Barreto et al. and assigned to the assignee of the present invention. A plurality of such nozzle segments 10 are assembled in circumferential side-by-side fashion to build up an HPT nozzle. The nozzle segment 10 includes one or more hollow, airfoil-shaped, internally-cooled vanes 12 each having a leading edge 14, a trailing edge 16, a root 18, a tip 20, and spaced-apart pressure and suction sidewalls 22 and 24, respectively. An arcuate outer band 26 is attached to the tips 20 of the vanes 12. An arcuate inner band 28 is attached to the roots 18 of the vanes 12. The outer and inner bands 26 and 28 define the outer and inner radial boundaries, respectively, of the primary gas flowpath through the nozzle segment 10.

Figure 2:
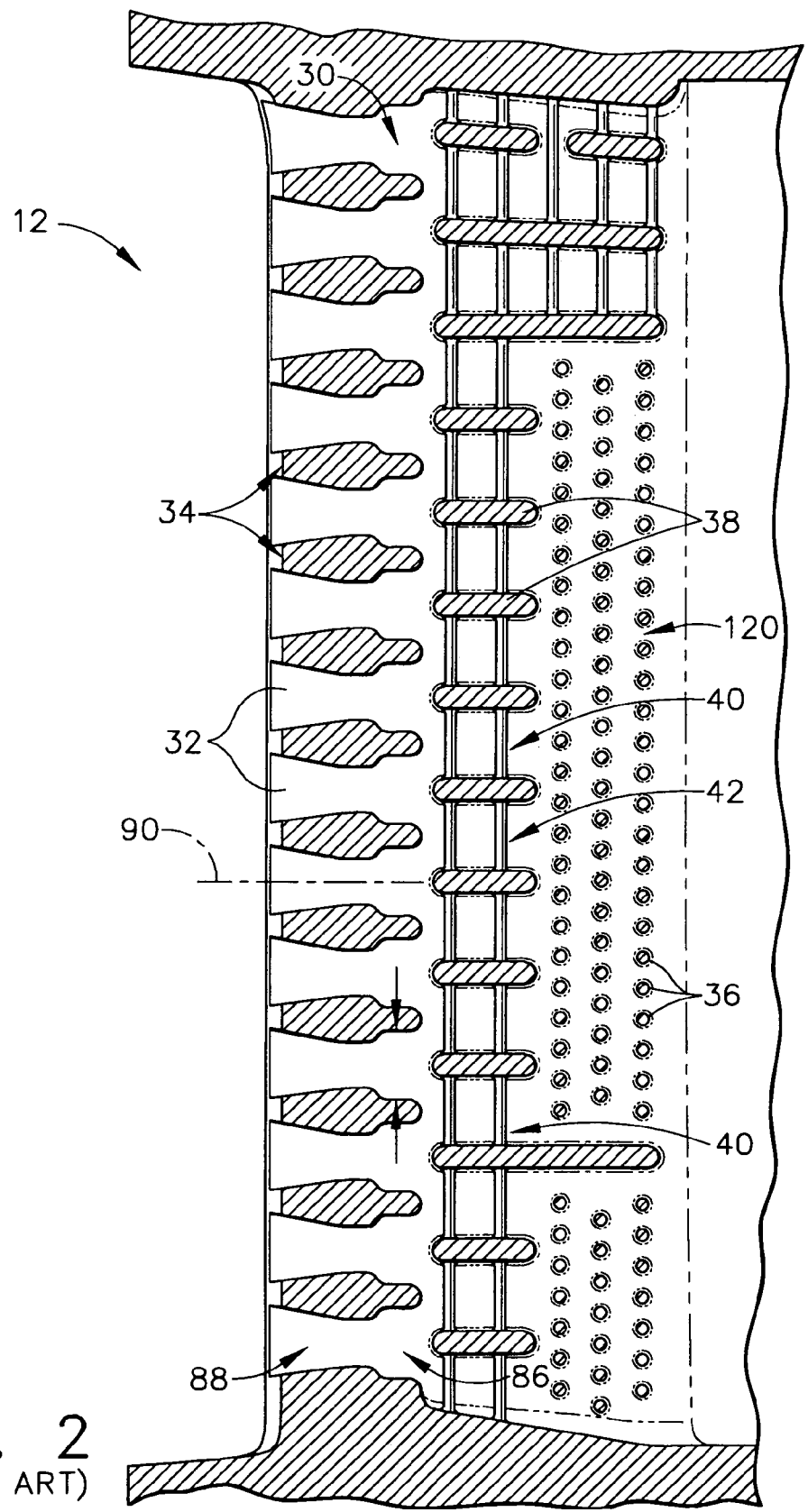
FIG. 2 is a cross-sectional view of a portion of the turbine nozzle of FIG. 1.

FIG. 2 illustrates the interior construction of a trailing edge portion of one of the vanes 12 of the nozzle segment 10. The pressure and suction sidewalls 22 and 24 define a hollow interior cavity 30 within the vane 12. A plurality of slots 32 extend through the pressure sidewall 22 and are disposed in flow communication with the interior cavity 30. Adjacent slots 32 are separated by lands 34. A bank of pins 36 extends through the interior cavity 30. Partitions 38 define a plurality of cooling channels 40 therebetween. Radially-aligned turbulators 42 are disposed between adjacent ones of the partitions 38.

In operation, cooling air is supplied to the interior cavity 30. The cooling air is channeled through pins 36. The staggered array of pins 36 induces turbulence into the cooling air and facilitate convective cooling of vane 12. The cooling air exits pins 36 and is routed through turbulators 42 which facilitate additional convective cooling of the vane 12. The cooling air then transitions through trailing edge slots 32.

While the configuration described in the '047 patent provides effective cooling, it is desired to reduced the thickness of the boundary layer near the partitions 38. Furthermore, the top of the lands 34 do not receive a substantial amount of cooling film coverage, and are generally much hotter than the floor (i.e. the pressure sidewall) of the trailing edge slots 32.

Figure 3:
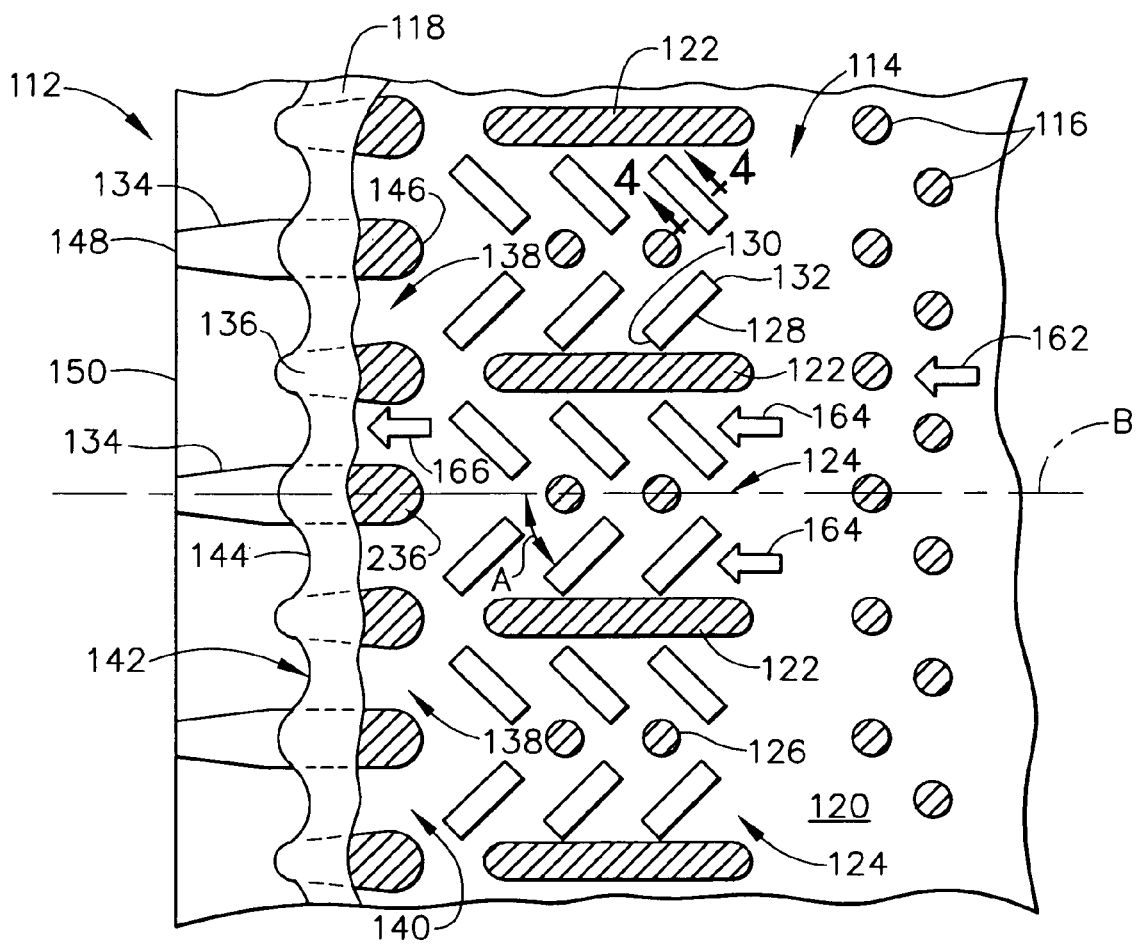
FIG. 3 is a cross-sectional view of a portion of a turbine nozzle vane constructed according to the present invention.

Accordingly, a portion of a turbine nozzle vane 112 constructed according to the present invention is shown in FIG. 3. The vane 112 is similar in overall construction to the prior art vane 12 except for the trailing edge portion. The vane 112 is part of a nozzle segment and may be an integral portion thereof or it may be an individual component. It is also noted that the cooling structure described herein may be used with other types of airfoils, such as rotating turbine blades.

The vane 112 includes a trailing edge cavity 114 which is disposed in fluid communication with a source of cooling air such as compressor discharge air. The trailing edge cavity 114 may be part of a larger interior serpentine channel of a known type (not shown) within the vane 112. A plurality of forward pins 116 are disposed in offset rows in the trailing edge cavity 114. The forward pins 116 extend between the pressure and suction sidewalls 118 and 120 (only a portion of the pressure sidewall 118 is shown in FIG. 3.) In the illustrated example the forward pins 116 each have a circular cross section and are arranged in radially-extending rows that are offset from each other. The shape, dimensions, number, and position of the forward pins 116 may be altered to suit a particular application.

Aft of the forward pins 116, a plurality of spaced-apart, longitudinally-extending partitions 122 extend between the pressure and suction sidewalls 118 and 120. The partitions 122 are arranged in a radially-extending array so as to define a plurality of cooling channels 124 therebetween. One or more aft pins 126 are disposed in each of the cooling channels 124, in a longitudinal row positioned at approximately the center of the radial width of the cooling channel 124. In the illustrated example the aft pins 126 each have a circular cross section. The shape, dimensions, number, and position of the aft pins 126 may be altered to suit a particular application.

Figure 4:
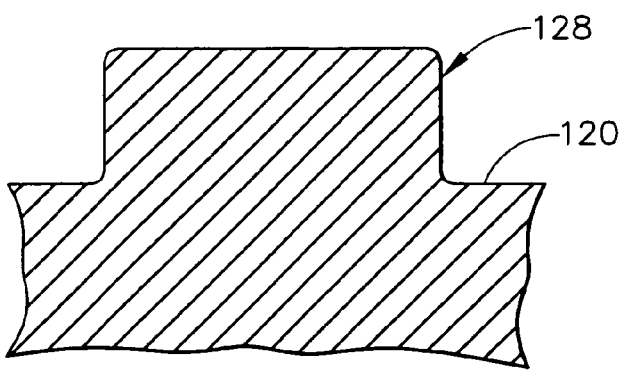
FIG. 4 is a view taken along lines 4-4 of FIG. 3.

A plurality of raised turbulence promoters or "turbulators" 128 are disposed on one or both of the suction sidewall 120 and pressure sidewall 118. The turbulators 128 are arrayed in longitudinal columns between the aft pins 126 and the partitions 122. The turbulators 128 are disposed at an angle "A" to the longitudinal axis "B" of the vane 112 such an aft end 130 of each turbulator 128 is nearer to the adjacent partition 122 than the forward end 132 of the same turbulator 128. In the illustrated example, the angle A is approximately 45°, however this may be modified to suit a particular application. The turbulators 128 have a rectangular cross-section as shown in FIG. 4. Other cross-sectional shapes may be used as well.

Figure 7:
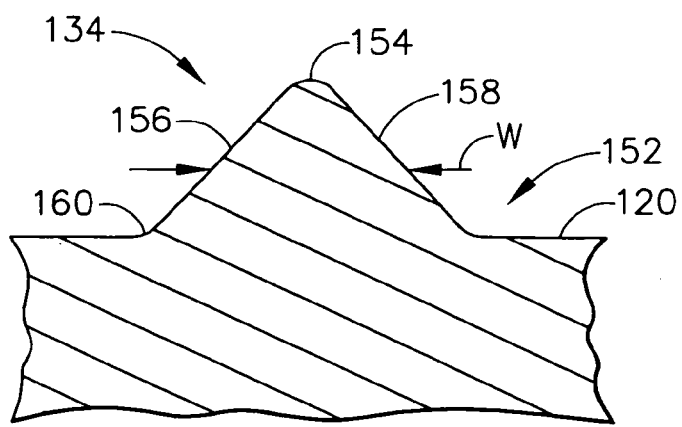
FIG. 7 is a view taken along lines 7-7 of FIG. 5, showing across-sectional shape of a trailing edge land.

A plurality of trailing edge dividers 136 extend between the pressure and suction sidewalls 118 and 120, aft of the partitions 122. The dividers 136 are arrayed in a radially-extending row so as to define a plurality of trailing edge slots 138 therebetween. Each trailing edge slot 138 has an inlet 140 in fluid communication with the trailing edge cavity 114 and a downstream exit 142 in which exhausts through the pressure sidewall 118 of the vane 112 at a breakout opening 144 thereof. Alternate ones of the dividers 136 extend downstream from the breakout opening 144 to form exposed lands 134. Each land 134 has a forward end 146 at the trailing slot exit 142 and an aft end 148 at the trailing edge 150 of the vane 112. As shown in FIG. 7, each land 134 also has a base 152 adjacent the suction sidewall 120, and a top surface 154 flush with the pressure sidewall 118. A pair of side faces 156 and 158 extend between the forward end 146 and aft end 148 of each land 134.

Figure 5:
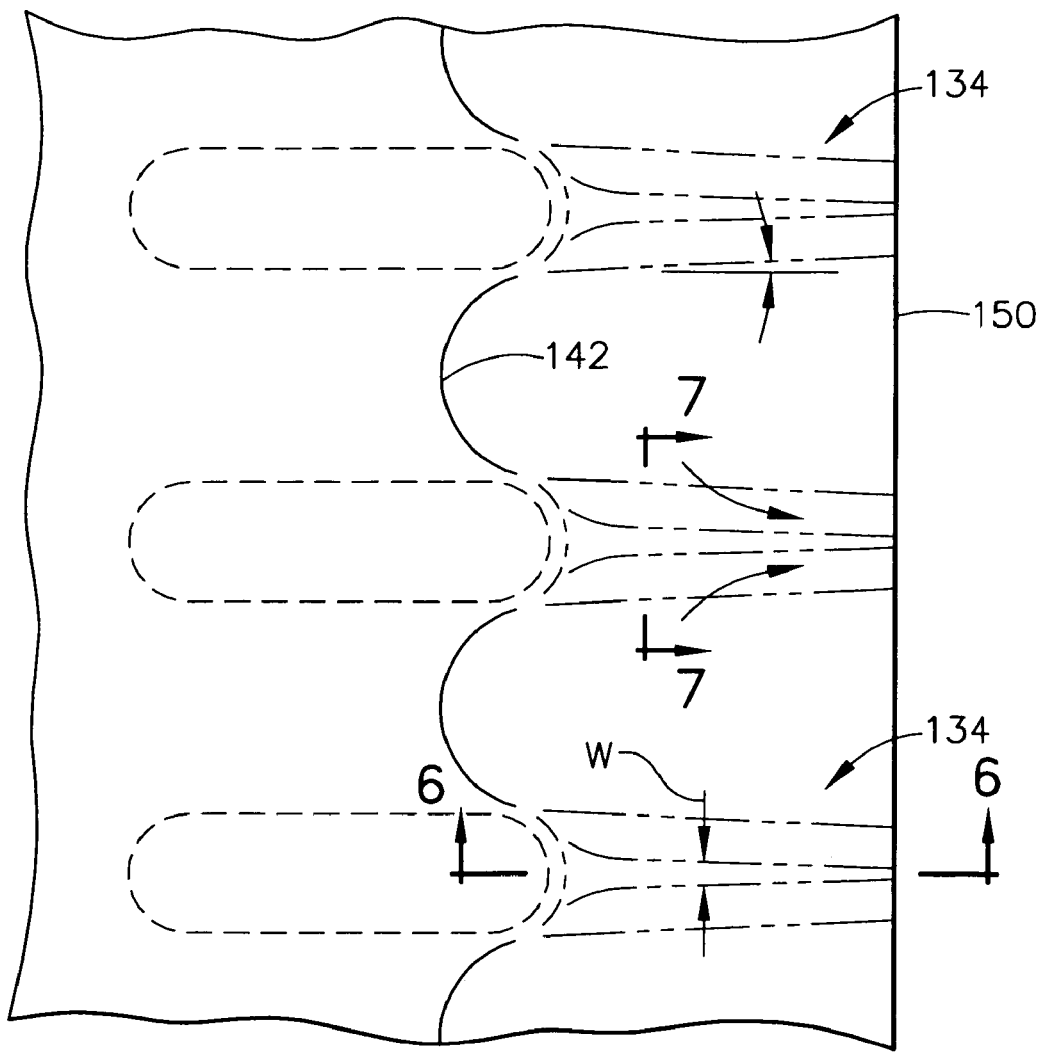
FIG. 5 is a side view of a portion of the vane of FIG. 3.
Figure 6:
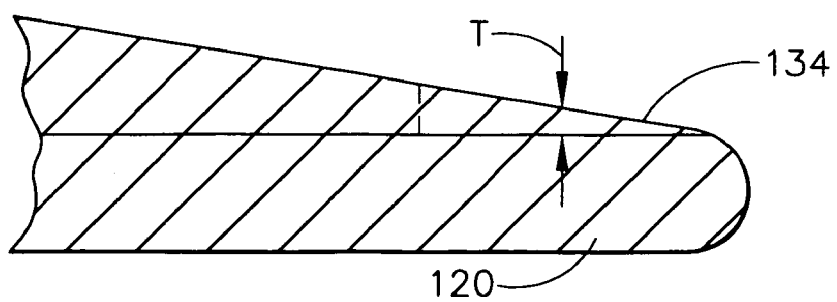
FIG. 6 is a view taken along lines 6-6 of FIG. 5.

The lands 134 may be tapered to reduce the amount of surface area at the hottest locations and to improve cooling film coverage. In the example shown in FIGS. 5,6, and 7, the lands 134 are tapered in 3 directions. The width "W" of each land 134 measured in a radial direction decreases from the trailing edge slot exit 142 to the trailing edge 150. The thickness "T" of each land 134 measured in a circumferential direction (i.e. from the pressure sidewall 118 of the vane 112 to the suction sidewall 120 of the vane 112) decreases from the trailing edge slot exit 142 to the trailing edge 150. Finally, the width "W" of each land 134 measured in a radial direction decreases from the base 152 of the land 134 (i.e. adjacent the suction sidewall 120) to the top surface 154 of the land 134.

Figure 8:
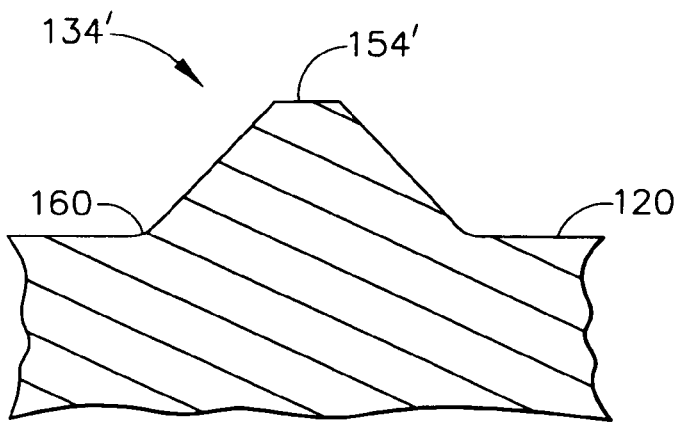
FIG. 8 is a cross-sectional view of an alternative trailing edge land.
Figure 9:
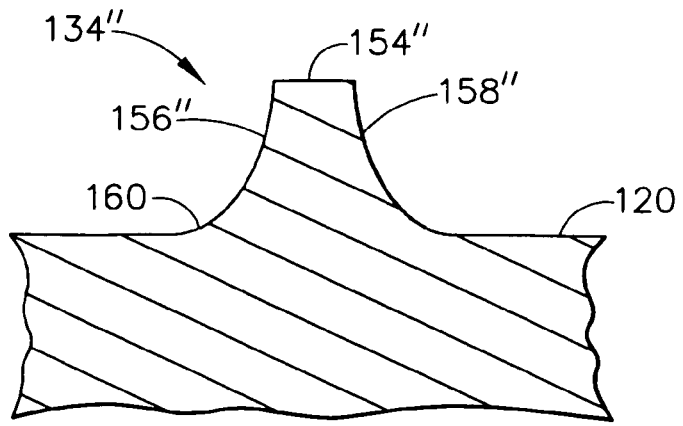
FIG. 9 is a cross-sectional view of another alternative trailing edge land.

The taper of the width "W" from the base 152 to the top surface 154 may be implemented in various ways. for example, as shown in FIG. 7, the side faces 156 and 158 of the land 134 are generally planar, and the top surface 154 is a curved surface with a small circular radius. FIG. 8 depicts another land 134' in which the top surface 154' is substantially planar and has a width greater than that of the top surface 154. Such a design may be easier to produce than the radiused top surface 154. FIG. 9 shows yet another alternative land 134" in which the side faces 156" and 158" have a concave curvature, and the top surface 154" is substantially planar. This may help diffusion of the cooling flow exiting the trailing edge slot 138 and promote film coverage of the land 134".

Figure 10:
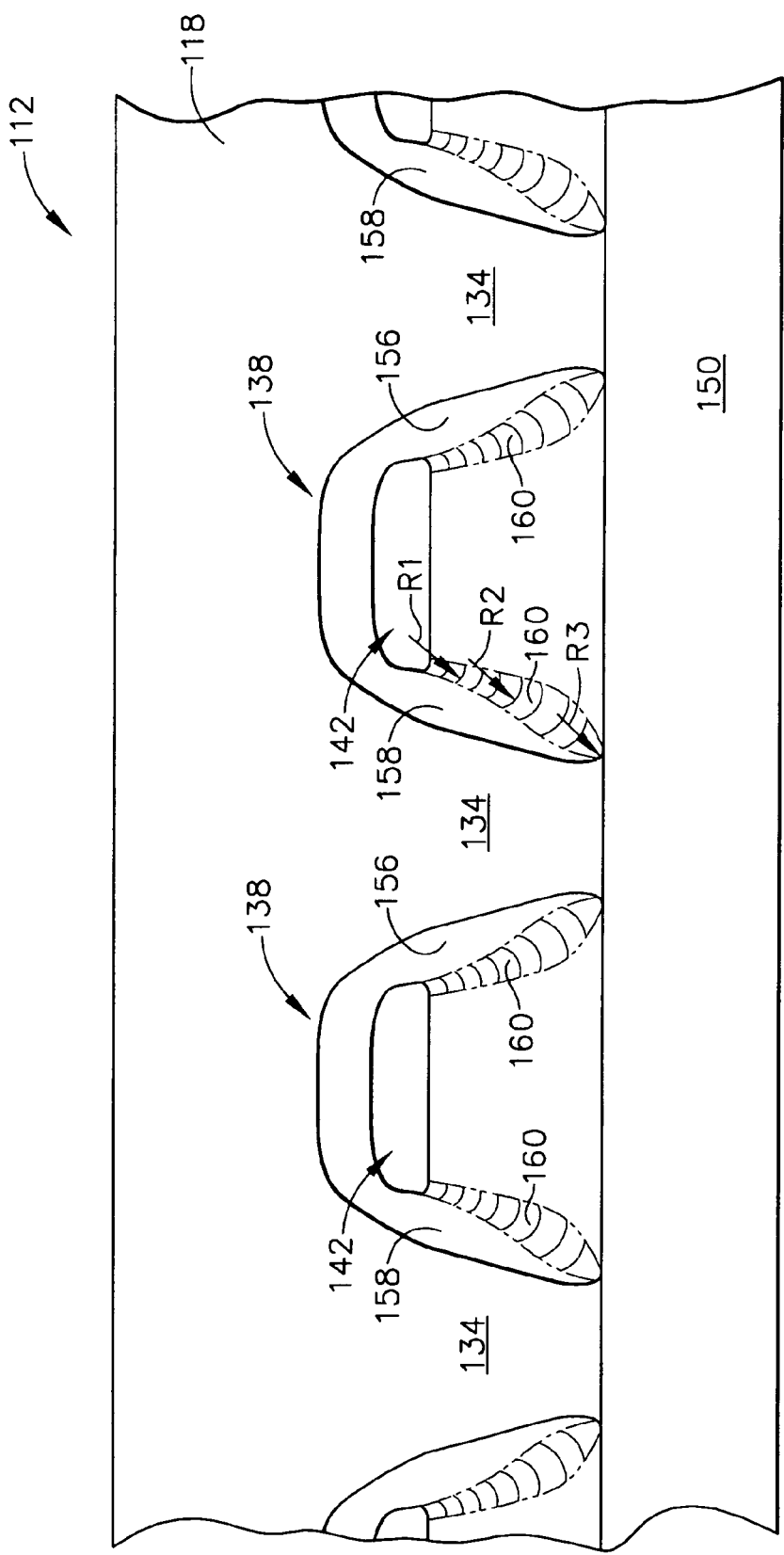
FIG. 10 is a rear view of a turbine airfoil showing a variable-radius slot fillet.

A concave fillet 160 is disposed between the side faces 156 and 158 and the suction sidewall 120, at the base 152 of the land 134. The radius "R" of the fillet 160 may be varied from the slot exit 142 to the trailing edge 150 to improve cooling film attachment. For example, as shown in FIG. 10, the fillet 160 may have a relatively small first radius R1 at the slot exit 142, increasing to a larger second radius R2 at a position axially aft of the slot exit 142, and then decreasing to an intermediate third radius R3 larger than the first radius R1 but smaller than the second radius R2, further downstream near the trailing edge 150. The fillet 160, the shape of the top surface 154 and the shape of the side faces 156 and 158 as described above may be selected to suit a particular application. For example, a particular land may include the curved top surface 154' depicted in FIG. 7 along with the concave side faces 156" and 158" shown in FIG. 9.

In operation, cooling air provided to the trailing edge cavity 114 flows through the forward pins 116 axially, as shown by the arrows 162. The cooling air flows around the aft pins 126 in the middle of the cooling channels 124, as shown by the arrows 164, to generate turbulence. Because effectively half of the structure that would have been partitions in the prior art vane are replaced with pins, there are more turbulence and thinner boundary layers inside the cooling channels 124 for better convection. The boundary layer inside the cooling channels 124 is interrupted by flow from the angled turbulators 128 which generate more turbulence and guide the flow of turbulent cooling air toward the partitions 122. The cooling air then flows through the trailing edge slots 138 and out their exits 142, as shown by the arrows 166, to provide film cooling for the downstream pressure sidewall 118. As the cooling air flows out the trailing edge slots 138, the tapered lands 134 encourage diffusion of the flow and promote attachment of a cooling film. The tapered lands 134 as well as the reduction in the number of lands compared to prior art airfoils also reduces the hot land surface area compared to prior art trailing edge lands, further encouraging the exit film to spread wider and improve the film coverage.

Figure 11:
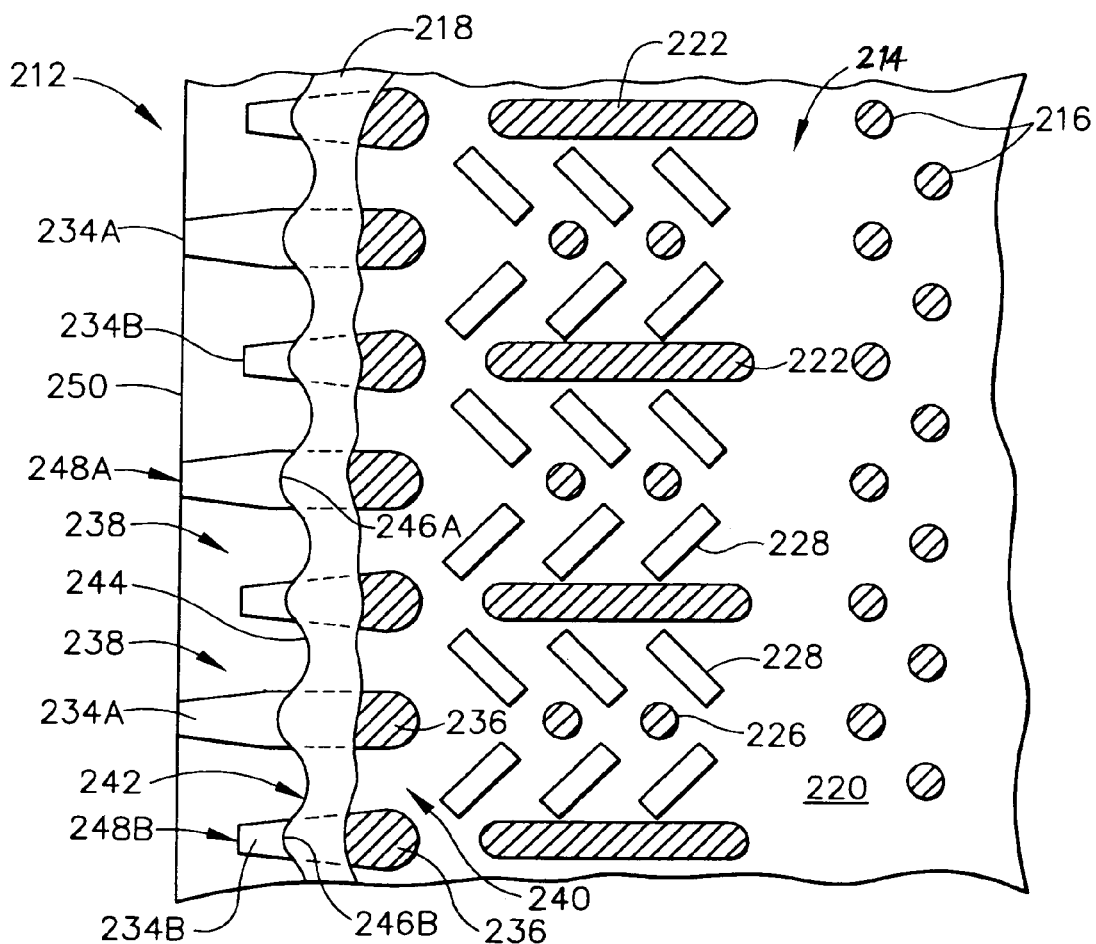
FIG. 11 is a cross-sectional view of an alternative turbine nozzle vane constructed according to the present invention.

FIG. 11 depicts a portion of a turbine nozzle vane 212 constructed according to an alternative embodiment of the present invention. The vane 212 is similar in overall construction to the vane 112 except for the trailing edge portion, and includes pressure and suction sidewalls 218 and 220, forward pins 216, a plurality of spaced-apart, longitudinally-extending partitions 222, aft pins 226, and turbulators 228.

A plurality of trailing edge dividers 236 extend between the pressure and suction sidewalls 218 and 220, aft of the partitions 222. The dividers 236 are arrayed in a radially-extending row so as to define a plurality of trailing edge slots 238 therebetween. Each trailing edge slot 238 has an inlet 240 in fluid communication with a trailing edge cavity 214 and a downstream exit 242 in which exhausts through the pressure sidewall 218 of the vane 212 at a breakout opening 244 thereof. The dividers 236 extend downstream from the breakout opening 244 to form alternating exposed first and second lands 234A and 234B. Each first land 234A has a forward end 246A at the trailing edge slot exit 242 and an aft end 248A at the trailing edge 250 of the vane 212. Each second land 234B has a forward end 246B at the trailing edge slot exit 242 and an aft end 248B downstream (i.e. axially rearward) of trailng edge slot exit 242 but forward of the trailng edge 250. The lands 234A and 234B may be tapered in two or more directions as described above.

The foregoing has described a cooled airfoil for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine, said airfoil having a longitudinal axis, a root, a tip, a leading edge, a trailing edge, and opposed pressure and suction sidewalls, and comprising:
   an array of radially-spaced apart, longitudinally-extending partitions defining a plurality of cooling channels therebetween;
   a plurality of aft pins disposed in at least one of said cooling channels and extending between said pressure and suction sidewalls;
   a plurality of elongated turbulators disposed in at least one of said cooling channels said turbulators oriented at an angle to said longitudinal axis such that an aft end of each of said turbulators is closer to an adiacent partition than a forward end of said turbulator; and
   an array of radially-spaced apart, longitudinally-extending dividers defining a plurality of trailing edge slots therebetween, each of said trailing edge slots having an inlet in fluid communication with said trailing edge cavity and an axially-downstream exit;
   wherein an exposed first land extends downstream from each of alternate ones of said dividers to said trailing edge and each of said lands includes:
   spaced-apart longitudinally extending side faces which intersect said suction sidewall and a concave fillet extending between each of said side faces and said suction sidewall; and
   wherein each of said fillets has:
   immediately adjacent said trailing edge slot exits, a first radius, downstream of said trailing edge slot exits, a second radius greater than said first radius; and
   adjacent said trailing edge, a third radius greater than said first radius and less than said second radius.

2. The airfoil of claim 1 further comprising a plurality of forward pins disposed axially forward of said cooling channels and extending between said pressure and suction sidewalls.

3. The airfoil of claim 1 wherein said are disposed at an angle of about 45 degrees to said longitudinal axis.

4. The airfoil of claim 1 wherein each of said lands is tapered such that:
   a width of said land measured in a radial direction decreases from said exit to said trailing edge; and
   a thickness of said land measured in a circumferential direction decreases from said exit to said trailing edge.

5. The airfoil of claim 1 wherein each of said lands is tapered such that a width of said land measured in a radial direction decreases from said suction sidewall to said pressure sidewall.

6. The airfoil of claim 1 wherein each of said lands includes spaced-apart longitudinally extending side faces, said side faces being substantially planar.

7. The airfoil of claim 1 wherein each of said lands includes spaced-apart longitudinally extending side faces, said side faces having a concave curvature.

8. The airfoil of claim 1 wherein each of said lands includes a top surface disposed between spaced-apart longitudinally extending side faces, said top surface having a convex curvature.

9. The airfoil of claim 1 wherein each of said lands includes a top surface disposed between spaced-apart longitudinally extending side faces, said top surface being substantially planar.

10. The airfoil of claim 1 wherein an exposed second land extends downstream from each of the remaining ones of said dividers past said trailing edge slot exit, said second lands being axially shorter than said first lands.

11. A turbine nozzle segment, comprising:
    an arcuate outer band;
    an arcuate inner band; and
    at least one airfoil disposed between said inner and outer bands, said airfoil having opposed pressure and suction sides extending between a leading edge and a trailing edge thereof, said airfoil comprising:
    an array of radially-spaced apart, longitudinally-extending partitions defining a plurality of cooling channels therebetween;
    a plurality of aft pins disposed in of at least one of said cooling channels and extending between said pressure and suction sidewalls;
    a plurality of elongated turbulators disposed in at least one of said cooling channels, said turbulators oriented at an angle to said longitudinal axis such that an aft end of each of said turbulators is closer to an adjacent partition than a forward end of said turbulator ;and
    an array of radially-spaced apart, longitudinally-extending dividers defining a plurality of trailing edge slots therebetween, each of said trailing edge slots having an inlet in fluid communication with said trailing edge cavity and an axially-downstream exit;

wherein an exposed first land extends downstream from each of alternate ones of said dividers; and each of said first lands includes:

spaced-apart longitudinally extending side faces which intersect said suction sidewall, and a concave fillet extending between each of said side faces and said suction sidewall; and wherein each of said fillets has:

immediately adjacent said trailing edge slot exits, a first radius;

downstream of said trailing edge slot exits, a second radius greater than said first radius; and adjacent said trailing edge, a third radius greater than said first radius and less than said second radius.

12. The turbine nozzle segment of claim 11 further comprising a plurality of forward pins disposed axially forward of said cooling channels and extending between said pressure and suction sidewalls.

13. The turbine nozzle segment of claim 11 wherein said turbulators are disposed at an angle of about 45 degrees to said longitudinal axis.

14. The turbine nozzle segment of claim 11 wherein each of said first lands is tapered such that:

a width of said land measured in a radial direction decreases from said exit to said trailing edge; and a thickness of said land measured in a circumferential direction decreases from said exit to said trailing edge.

15. The turbine nozzle segment of claim 11 wherein each of said first lands is tapered such that a width of said land measured in a radial direction decreases from said suction sidewall to said pressure sidewall.

16. The turbine nozzle segment of claim 11 wherein each of said first lands each includes spaced-apart longitudinally extending side faces, said side faces being substantially planar.

17. The turbine nozzle segment of claim 11 wherein each of said first lands includes spaced-apart longitudinally extending side faces, said side faces having a concave curvature.

18. The turbine nozzle segment of claim 11 wherein each of said first lands includes a top surface disposed between spaced-apart longitudinally extending side faces, said top surface having a convex curvature.

19. The turbine nozzle segment of claim 11 wherein each of said first lands includes a top surface disposed between spaced-apart longitudinally extending side faces, said top surface being substantially planar.

20. The turbine nozzle segment of claim 11 wherein an exposed second land extends downstream from each of the remaining ones of said dividers past said trailing edge slot exit, said second lands being axially shorter than said first lands.

* * * * *

UNITED STATES PATENT AND TRADEMARK OFFICE
CERTIFICATE OF CORRECTION

PATENT NO. : 7,575,414 B2 Page 1 of 1
APPLICATION NO. : 11/097604
DATED : August 18, 2009
INVENTOR(S) : Ching-Pang Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Seventh Day of September, 2010

David J. Kappos
*Director of the United States Patent and Trademark Office*